United States Patent [19]

Johansson

[11] Patent Number: 4,601,179
[45] Date of Patent: Jul. 22, 1986

[54] DRYER FOR A REFRIGERATION PLANT

[75] Inventor: Gustav A. Johansson, Nordborg, Denmark

[73] Assignee: Danfoss A/S, Nordborg, Denmark

[21] Appl. No.: 752,124

[22] Filed: Jul. 5, 1985

[30] Foreign Application Priority Data

Jul. 12, 1984 [DE] Fed. Rep. of Germany ....... 3425735

[51] Int. Cl.$^4$ .............................................. F25B 43/04
[52] U.S. Cl. ........................................ 62/475; 62/503; 210/DIG. 6; 417/313
[58] Field of Search .................. 62/474, 475, 503; 417/313; 210/DIG. 6

[56] References Cited

U.S. PATENT DOCUMENTS

| 2,446,853 | 8/1948 | Savidge | 62/474 |
| 2,705,405 | 4/1955 | Uhlman | 62/474 |
| 3,572,050 | 3/1971 | Bottum | 62/475 |
| 4,417,451 | 11/1983 | Spauschus | 62/475 |

Primary Examiner—Ronald C. Capossela
Attorney, Agent, or Firm—Wayne B. Easton

[57] ABSTRACT

The invention relates to a dryer unit for an encapsulated refrigerant compressor unit. The capsule of the compressor unit has suction and compression nipples and an auxiliary nipple. A dead end housing unit containing a drying agent is connected to the auxiliary nipple.

11 Claims, 4 Drawing Figures

DRYER FOR A REFRIGERATION PLANT

The invention relates to a dryer for a refrigeration plant comprising an encapsulated refrigerant compressor of which the capsule comprises a suction and a compression conduit nipple and an auxiliary nipple with a stop member for processing purposes, the dryer having a housing containing a drying agent.

Such refrigerant dryers were hitherto built into the refrigerant circuit. Usually they were disposed in the region of the throttling point, i.e. for example into the capillary tube between the condenser and the evaporator (Plank-Kuprianoff "The Refrigetor" 1960, page 19). However, it is also known to use a sound damping chamber as the dryer (DE-PS No. 24 51 524).

It is quite usual to provide the capsule of a refrigerant compressor with an auxiliary nipple for processing purposes. It serves, for example, to fill or replenish refrigerant, for evacuation or for other purposes. In most cases, it is provided with a so called processing tube which serves as a stop member on the one hand by being closed by a depression or soldering. However, on the other hand it has a length such that it can still be used one or two times for servicing purposes by severing. The tube is usually of copper with a diameter of ¼" or 6 mm.

The invention is based on the problem of increasing the life of a refrigeration plant provided with a dryer.

This problem is solved according to the invention in that the dryer housing is connected to the auxiliary nipple and is disposed between the capsule wall and the stop member.

This construction is based on the consideration that when using the known drying agents there is inevitable abrasion in powder form through vibrations caused by friction of the particles with each other or with the housing, the powder being carried through the plant by the refrigerant. It also reaches the lubricating points of the compressor and there leads to premature wear of the moving parts. If one employs a drying agent that is as hard as possible to minimise abrasion, then the parts rubbed off are also hard and produce a particularly effective abrasive.

According to the invention, the dryer is disposed beyond the refrigerant circuit, i.e. in a dead end. The dryer is not traversed by refrigerant during operation. Consequently, there is considerably less danger of abraded particles reaching the lubricating points of the compressor. Nevertheless, the effectiveness of the dryer remains practically unchanged. In particular, one may also employ softer and consequently cheaper drying agents, for example silica gel, Prespan or related materials in loose form or in the form of moulded inserts.

In most cases, a filter for dirt is also superfluous. This likewise brings about additional savings.

As a result of combining the dryer with the auxiliary nipple, the work required to install the dryer is very small. Compared with the usual building into the capillary tube, one can often save one soldered connection. The capillary tube can be connected directly between the condenser outlet and the evaporator inlet. The arrangement of the dryer also permits one to make units by the roll bonding process in which the evaporator, condenser and throttle form a unit and there is therefore no possibility of arranging the dryer in the region of the throttle point.

Since the dryer is connected to the capsule, the refrigerant placed in the capsule is dried fairly quickly. There is therefore no longer any danger of insufficient dried refrigerant possibly giving rise to an ice plug at the throttle point when first starting the plant.

If the stop member is formed by a processing tube, it is particularly favourable to combine the dryer housing and the processing tube to form a unit. The application of this unit to the capsule will then not present more work than the application of the processing tube did hitherto. In particular, this unit can be prefrabricated independently of the encapsulated refrigerant compressor.

Preferably, the dryer housing has a connecting end which is pushed onto the auxiliary nipple. This pushing on enables the hermetic seal to be achieved particularly easily. In addition, the connecting end defines a minimum cross section which is suitable for the entire dryer housing if the latter is sleeve-shaped.

In particular, it is possible with this construction for the connecting end to be pressed with a hermetic seal onto the outside of the auxiliary nipple by cold flow.

In general, however, the dryer housing can also be connected to the auxiliary nipple by soldering.

Another alternative is for the dryer housing to be made in one piece with the auxiliary nipple. For example, it is made longer than hitherto to start with.

In a preferred embodiment, the dryer housing has a cross-sectional construction between the capsule and a section containing the drying agent. This constriction ensures that the drying agent remains in its proper place. In the case of a sleeve-shaped dryer housing, the constriction can be formed by a depression in the wall of the sleeve.

If the drying agent is not moulded to form an insert but consists of loosely filled particles, the internal width of the constriction should be less than the smallest dimension of the particles.

It is particularly advantageous for the internal width of the constriction to be less than the smallest dimension of the particles abraded from the drying agent. It has been found that the drying effect is still obtained if the free cross-section is so small that only water molecules can pass and all dust and powder particles are held back.

In a further embodiment of the invention, at least the part of the housing containing the drying agent is disposed below the auxiliary nipple. This ensures that abraded particles are also prevented from reaching the capsule interior under gravity but will remain in the dryer housing under all circumstances.

At least the part of the sleeve-shaped dryer housing containing the drying agent should have a substantially vertical axis. This ensures that the dryer will not project too far from the capsule and hinder its installation.

Preferably, the dryer housing is disposed adjacent to the connecting box of the refrigerant compressor. Here there is in any case sufficient space for accommodating the dryer.

Preferred examples of the invention will now be described in more detail with reference to the drawing wherein.

Figure 1:
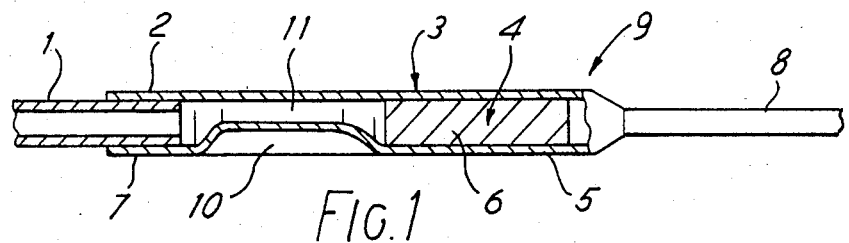
FIG. 1 is a longitudinal section through a first embodiment of a dryer according to the invention.

In the FIG. 1 embodiment, the connecting end 2 of a sleeve-shaped housing 3 of a dryer 4 is pushed onto the free end of an auxiliary nipple 1. A drying agent 6 disposed in the section 5 is present in the form of loose particles or a moulded insert. It consists of LMS balls, silica gel, Prespan or like materials. The sleeve-shaped dryer housing 3 is made from aluminium or copper and hermetically sealingly connected to the connecting nipple 1 in the region of the overlap 7. This can be done by soldering or by cold flow caused by external pressure.

A processing tube 8 of copper applied to the free end of the dryer housing 3 such as by soldering forms a prefabricated unit 9 with the housing 3. A cross-sectional constriction 11 is produced by means of a depression 10 in the housing between the drying agent 6 and the connecting end 2. This constriction prevents the drying agent particles 6 from reaching the connecting end 2.

Figure 3:
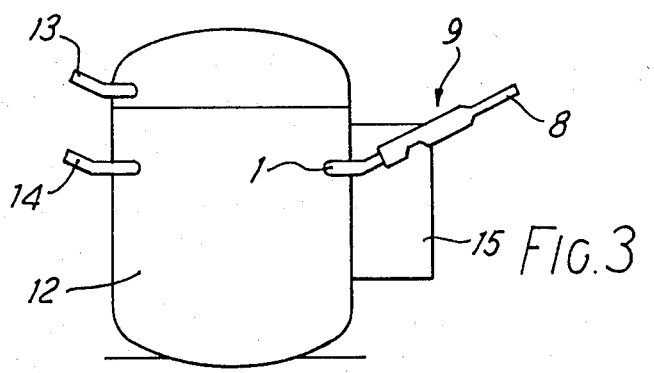
FIG. 3 shows the dryer applied to the auxiliary nipple before filling with refrigerant.

FIG. 3 shows how the unit 9 is connected to the auxiliary nipple 1 of the capsule 12 of a refrigerant compressor. The capsule 12 also comprises a pressure conduit nipple 13 and a suction conduit nipple 14. A switch box 15 is applied to the outer wall. The auxiliary nipple 1 is located in its vicinity.

Figure 4:
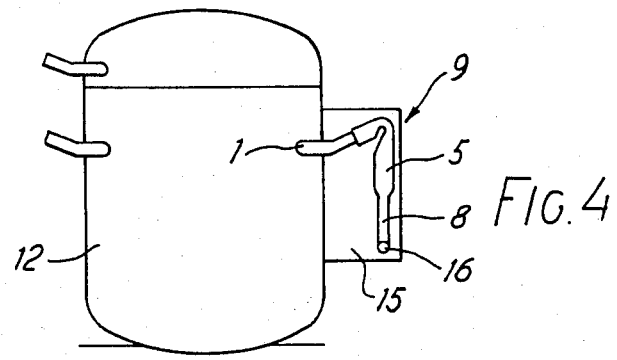
FIG. 4 shows the dryer in the finally assembled condition.

In the position shown in FIG. 3, an evacuation and filling process can be conveniently effected with an apperatus placed over the processing tube 8. On conclusion, the processing tube 8 is soldered shut at its end 16 or squeezed together. Thereafter, and as is shown in FIG. 4, the housing section 5 containing the drying agent 6 is bent downwardly so that its axis extends substantially vertically, i.e. parallel to the outer wall of the capsule 12. The drying agent or its abraded particles are therefore located beneath the auxiliary nipple 1 and cannot reach the interior of the capsule. During bending, the internal width of the cross-sectional constriction 11 has become still narrower. Preferably, it is smaller than the smallest dimension of the abraded particles. This practically makes it 100% certain that abraded particles will not enter the refrigerant circuit.

Figure 2:
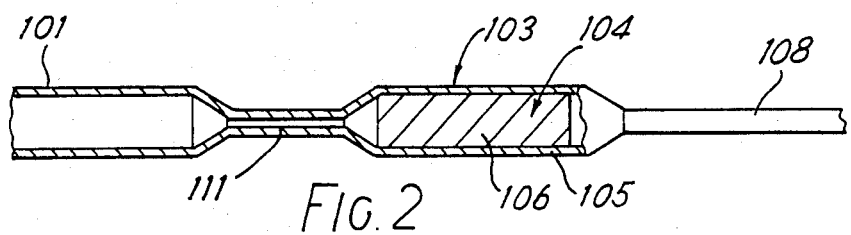
FIG. 2 is a section through a second embodiment of a dryer according to the invention.

In the FIG. 2 embodiment, in which corresponding components bear reference numerals increased by 100, the dryer housing 103 is connected in one piece to the auxiliary nipple 101 by way of a constriction 111 created by compressing the sleeve-like wall of the housing. Whereas in the FIG. 1 embodiment the unit 9 is an additional part which can be used in conjunction with a conventional auxiliary nipple 1, in the FIG. 2 embodiment the capsule is provided with a somewhat longer auxiliary nipple 101 of somewhat larger diameter that can later be provided with the constriction 111 by squeezing it together and into which the drying agent 106 is introduced. The whole is then completed by applying the processing tube 108.

Other constructions are also-possible. For example, the dryer housing can receive a larger cross-section than the connecting end 2. Instead of the stop member in the form of a processing tube 8 one can also provide a valve.

I claim:

1. An encapsulated refrigerant compressor unit, comprising, a capsule casing for housing a compressor, suction and compression nipples and an auxiliary nipple for providing fluid communication between the interior and exterior of said casing each connected separately to said capsule casing, a flow through housing unit having an inner end thereof connected to said auxiliary nipple, a drying agent in said housing unit, and means for selectively opening and closing the outer end of said flow through housing to permit adding a refrigerant therethrough to the interior of said capsule casing.

2. A unit according to claim 1 including a dead end tube connected to said housing unit at the opposite end thereof from said auxiliary nipple.

3. A unit according to claim 2 wherein said dead end tube is also a refrigerant filling tube.

4. A unit according to claim 2 characterized in that said housing unit and said dead end tube and said auxiliary nipple are made in a single piece.

5. A unit according to claim 1 characterized in that said housing unit has a connecting end which is pushed over said auxiliary nipple.

6. A unit according to claim 1 characterized in that said housing unit contains a cross-sectional constriction between said auxiliary nipple and said drying agent.

7. A unit according to claim 6 characterized in that said housing unit is sleeve-shaped and said constriction is formed by a depression in the wall of said housing unit.

8. A unit according to claim 6 characterized in that said drying agent consists of loosely filled particles and the internal width of said constriction is less than the smallest dimension of said particles.

9. A unit according to claim 8 characterized in that said internal width of said constriction is smaller than the smallest dimension of particles rubbed off said drying agent particles.

10. A unit according to claim 1 characterized in that at least a part of said housing unit containing said drying agent is disposed below said auxiliary nipple.

11. A unit according to claim 1 characterized in that at least the part of said housing unit containing said drying agent has a substantially vertical axis.

* * * * *